United States Patent [19]
Volz et al.

[11] Patent Number: 5,335,981
[45] Date of Patent: Aug. 9, 1994

[54] BRAKE SYSTEM WITH ANTI-LOCK CONTROL AND TRACTION SLIP CONTROL

[75] Inventors: Peter Volz, Darmstadt; Dalibor Zaviska, Frankfurt am Main, both of Fed. Rep. of Germany

[73] Assignee: Alfred Teves GmbH, Fed. Rep. of Germany

[21] Appl. No.: 934,587

[22] Filed: Aug. 24, 1992

[30] Foreign Application Priority Data

Aug. 24, 1991 [DE] Fed. Rep. of Germany ....... 4128091

[51] Int. Cl.⁵ .............................................. B60T 13/20
[52] U.S. Cl. .................................. 303/113.3; 60/567
[58] Field of Search ............ 303/10, 12, 113.1, 113.2, 303/113.3, 114.3, 116.1, 116.2, 115.2; 60/567

[56] References Cited

U.S. PATENT DOCUMENTS

| | | | |
|---|---|---|---|
| 4,020,931 | 5/1977 | Sertori | 60/567 X |
| 4,134,266 | 1/1979 | Sertori | 60/567 X |
| 4,812,723 | 3/1989 | Shimizu | 303/115.2 X |

FOREIGN PATENT DOCUMENTS

| | | |
|---|---|---|
| 3040540 | 5/1982 | Fed. Rep. of Germany . |
| 3800854A1 | 7/1989 | Fed. Rep. of Germany . |
| 3906530 | 9/1990 | Fed. Rep. of Germany . |
| 4001421 | 7/1991 | Fed. Rep. of Germany ... 303/113.2 |
| 4029407 | 8/1991 | Fed. Rep. of Germany . |
| 4016560 | 11/1991 | Fed. Rep. of Germany . |
| 4017873 | 12/1991 | Fed. Rep. of Germany . |
| 2230580 | 10/1990 | United Kingdom . |
| 2238836 | 6/1991 | United Kingdom ............. 303/113.2 |

*Primary Examiner*—Douglas C. Butler
*Assistant Examiner*—Alfred Muratori
*Attorney, Agent, or Firm*—Dykema Gossett

[57] ABSTRACT

The present invention relates to a brake system with anti-lock control and traction slip control having a master cylinder to which braking pressure can be applied by a brake pedal, which is furnished with pressure fluid by a pressure fluid reservoir, and which is connected to at least one brake cylinder of a driven wheel via at least one brake line; a low-pressure accumulator and a return-delivery pump for the anti-lock operation, as well as a supply pressure generating source with a limited fuel delivery for traction slip control which is arranged in the pressure fluid reservoir. The supply pressure generating source can be used for the rapid preliminary fill-up of the brake cylinder when the pump starts to operate, as well as for generating a supply pressure on the suction side of the pump.

7 Claims, 2 Drawing Sheets

BRAKE SYSTEM WITH ANTI-LOCK CONTROL AND TRACTION SLIP CONTROL

TECHNICAL FIELD

The present invention generally relates to a brake system with anti-lock control and traction slip control and more particularly to brake systems with a supply pressure generating source (hereinafter referred to as supply pressure generating means) means which is integral with the pressure fluid reservoir.

A brake system with anti-lock capability utilizing fluid return delivery is known from German patent application DE 38 00 854 A1. An additional pressure chamber is provided in this system which can be pressurized by means of a vacuum tank and which connects to the suction side of the pump. When traction slip control is performed, the pressure chamber furnishes the pump with a supply pressure which permits use of a non-self-priming pump as is customary in closed-loop anti-lock systems even for traction slip control. Advantage is taken of the fact that only a limited pressure fluid volume is required for filling up the brake circuits so that there is no need for a charging pump which is constantly delivering fluid out of the pressure fluid reservoir. However, this solution demands a considerable mounting space in the engine compartment for the vacuum tank with the pressure chamber.

It is, therefore, an object of the present invention to diminish the mounting space of a brake system of this type.

SUMMARY OF THE INVENTION

The principle of this invention resides in the economy of an additional construction element by integrating the supply pressure generating means in the pressure fluid reservoir.

Moreover, a line is economized when the supply pressure is introduced through the master cylinder.

The supply pressure generating means can also be made use of for the fast preliminary fill-up of the brake cylinders during start-up of the pump as well as for the generation of a supply pressure on the suction side of the pump. The present invention is not limited to non-self-priming pumps though. Improved delivery abilities will result also for self-priming pumps. This applies in particular in respect of extreme cold when the pressure fluid has a high viscosity.

It is particularly favorable to use a common connecting socket from the pressure fluid reservoir to the master cylinder for the replenishing function of the reservoir and for the supply pressure generation as the master cylinder need not be modified. An operation by way of vacuum is advisable because vacuum boosters are normally used, and it is only necessary to have a branch line of the evacuation line extend to the supply pressure generating means.

Favorable improvements will be described hereinbelow with reference to the accompanying drawings.

DETAILED DESCRIPTION OF THE INVENTION

Figure 1:
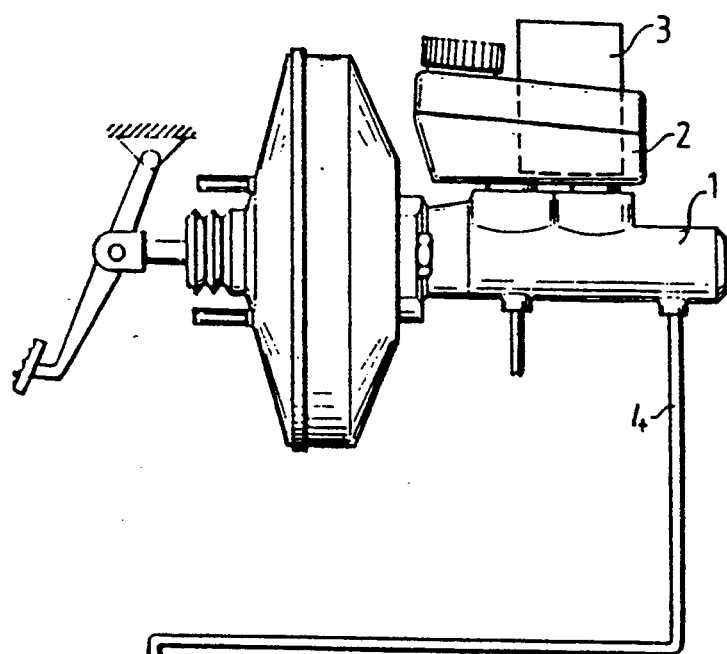
FIG. 1 is a schematic view of an inventive brake system.
Figure 1:
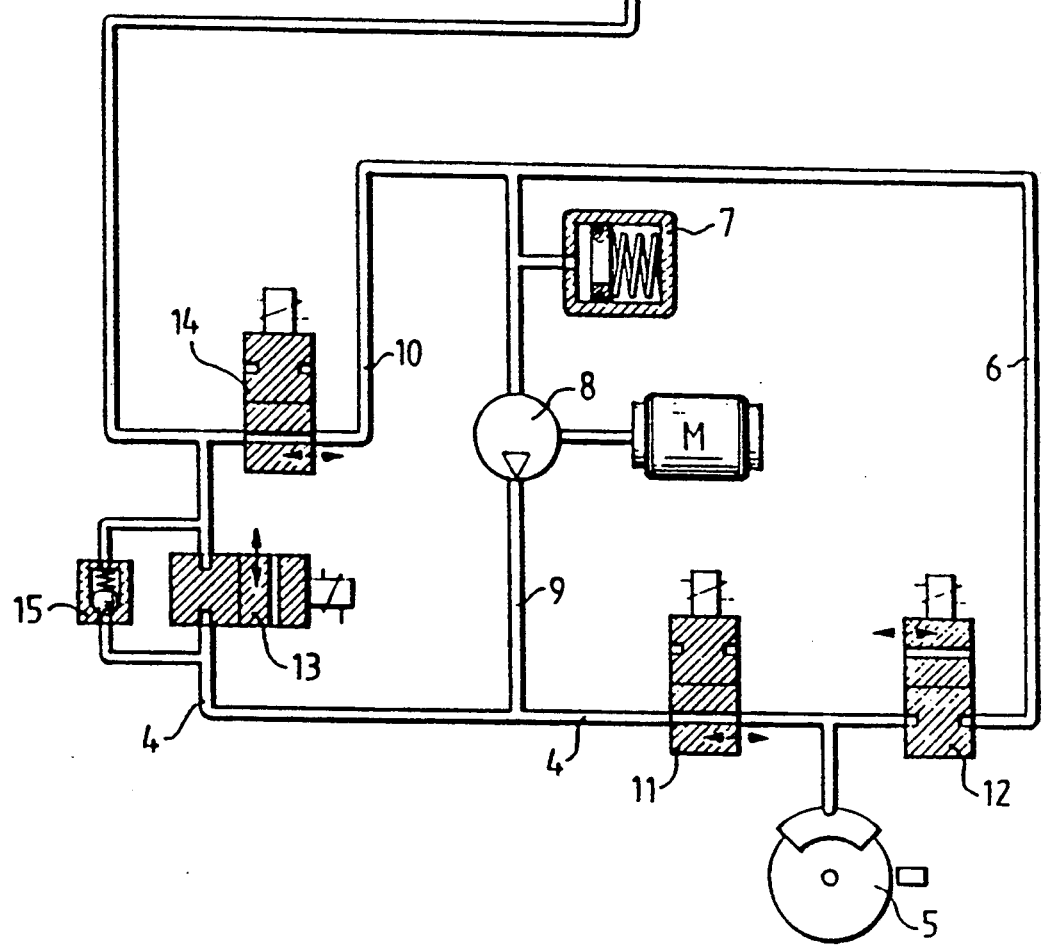

For the sake of clarity, FIG. 1 is restricted to a few details important for understanding the invention. The pressure fluid reservoir 2 with the pressure generating means 3 is fitted on the master cylinder 1. The brake line 4 extends from the master cylinder 1 to the brake cylinder 5 of a driven wheel. From there the return line 6 leads to the low-pressure accumulator 7 which is arranged on the suction side of the pump 8. The suction side of the pump 8 connects to the brake line 4 via the pressure line 9. For the purpose of traction slip control, the pump 8 is furnished with the suction line 10 which is in communication with the pressure fluid reservoir 2 via the master cylinder 1.

Pressure control in the brake cylinder 5 is performed by electromagnetic operation of the inlet valve 11 and the outlet valve 12. When traction slip control becomes necessary, the brake line 4 can be interrupted by the shut-off valve 13, while the suction valve 14 in the suction line 10 remains open. The suction valve 14 is closed electromagnetically and the shut-off valve 13 is opened on each pedal-operated braking action. In order to protect the motor of the pump against overheating and to protect the lines against pressure overload in the event of a traction slip control operation, and in order to thus minimize operating noise, the pressure-relief valve 15 is connected in parallel to the shut-off valve 13 and opens towards the master cylinder in the presence of a difference in pressure of roughly 70 bar if the driven axle is the front axle; the opening pressure will amount to roughly 140 bar if the rear axle is concerned.

Since the anti-lock function of a like brake system with fluid return delivery is sufficiently known from the state of the art, only traction slip control shall be discussed herein. At the beginning of a traction slip control operation all valves 11, 12, 13 and 14 adopt their illustrated position, that is the initial position. An electric signal indicative of excessive traction slip triggers the operation of the supply pressure generating means 3. The pump 8 starts its operation at the same time. Preferably, pump 8 is not self-priming in order to render any formation of vacuum impossible. But even if a self-priming pump is used, the supply pressure generating means is advantageous, since in particular at low temperatures suction losses of the pump which are due to viscosity will be compensated for.

Another advantage results when the supply pressure generating means 3 is used for the preliminary fill-up of the brake cylinder 5 during a traction slip control operation so that a quick pressure build-up—approximately 70 bar in the case—can take place even during the start-up time of the pump. To this end the shut-off valve 13 is opened for a short time during the operation of the supply pressure generating means 3, and the suction valve 14 is closed.

Figure 2:
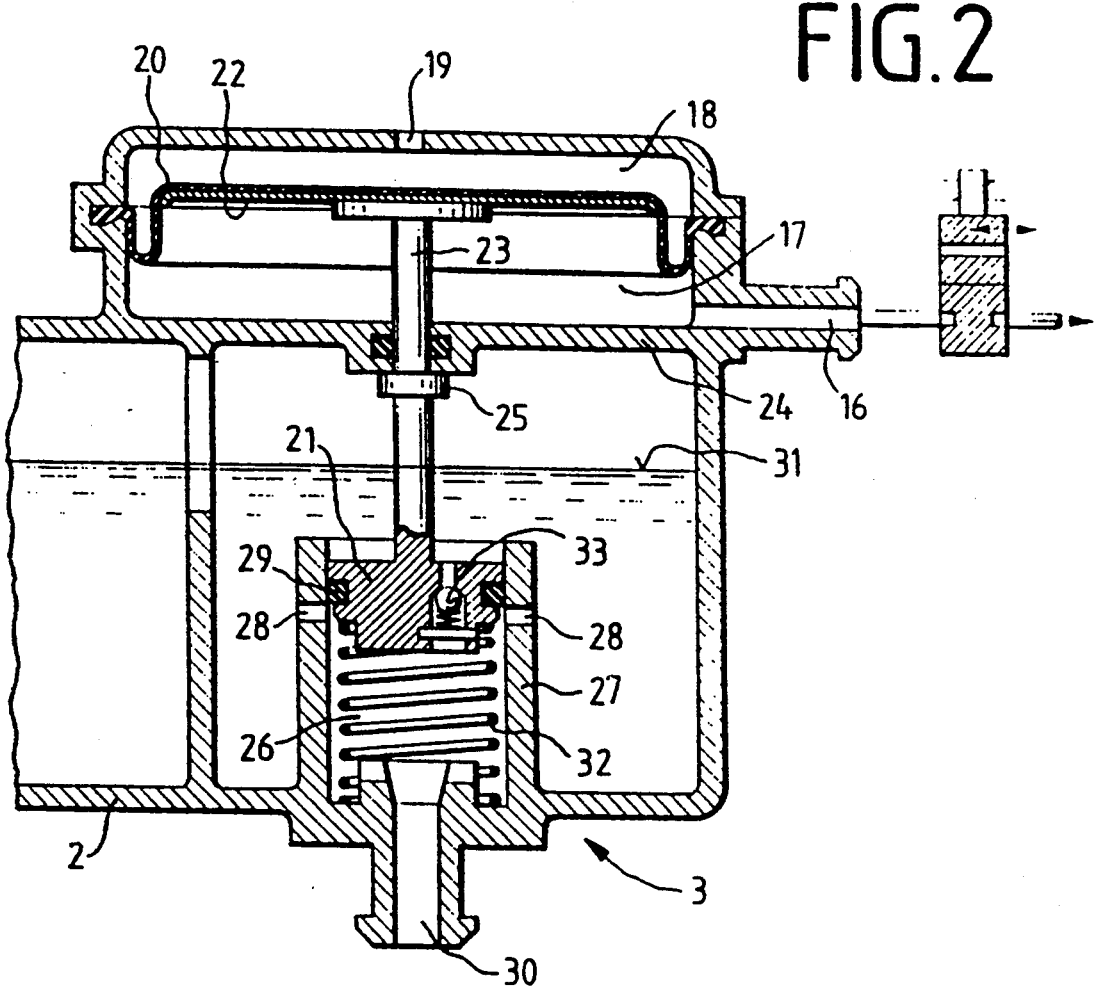
FIG. 2 is a vacuum-operated supply pressure generating means.

The embodiment of the supply pressure generating means 3 illustrated in FIG. 2 is operated by a vacuum source through the vacuum port 16. Chamber 17 is evacuated, while chamber 18 is constantly under atmospheric pressure through the compensation port 19. The two chambers 17 and 18 are isolated from each other by the rolling diaphragm 20. On evacuation of the chamber 17 the atmospheric pressure above the rolling diaphragm 20 pushes the piston 21 downwards via the plate 22 and the tappet 23. Said tappet 23 extends sealedly through the reservoir top surface 24 and includes beneath the reservoir top surface 24 the circumferential projection 25 which confines the tappet's stroke upwardly.

Piston 21, in its upward position, closes off pressure chamber 26 whose cylindrical wall 27 is made integrally with the pressure fluid reservoir 2 herein and which lies entirely beneath the pressure fluid level 31. Said wall 27 includes supply bores 28 which are overridden by the piston 21 once the chamber 17 is evacuated, piston 21 together with ring seal 29 being in sealing abutment on the wall 27. With the piston 21 descending further, the pressure fluid displacing out of the pressure chamber 26 from this point on will be urged via the port 30 through the master cylinder 1 into the brake circuit.

Once atmospheric pressure is re-applied to the chamber 17, piston 21 will be shifted upwards again by the compression spring 32 to adopt its initial position shown. The non-return valve 33 serves for pressure compensation to this effect as long as the piston 21 is still placed beneath the supply bores 28.

The pressure fluid supply during a pedal-operated braking operating when the piston 21 has adopted this initial position is likewise effected via the supply bores 28.

When the pump 8 of the brake system is a self-priming pump and the supply pressure generating means 3 is provided for the pre-filling of the brake cylinder 5, the non-return valve 33 performs the additional function of ensuring continued pressure fluid supply in case there is additional fluid requirement for traction slip control.

Figure 3:
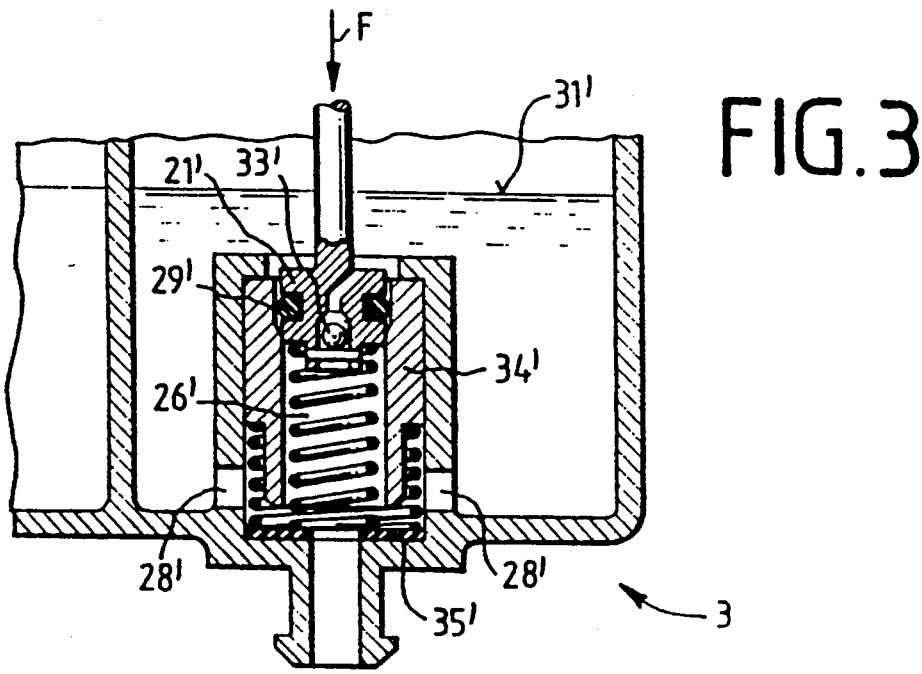
FIG. 3 is a detail cross-sectional view of an alternative embodiment of the vacuum-operated supply pressure generating means.

FIG. 3 is a second embodiment of the supply pressure generating means 3. The force F is generated by means of vacuum like in FIG. 2 or in any other way, for instance electromotively or by virtue of a lifting magnet. Force F acts upon the piston 21' which due to friction from ring seal 29 pushes the sleeve 34' downwardly. Sleeve 34' will then move to abut on the annular sealing plate 35' and closes the connection between pressure chamber 26' and the supply bores 28'. Pressure develops in the pressure chamber 26' when the piston 21' continues to move downwards.

Admittedly, this arrangement is more complicated than that according to FIG. 2, yet if offers the advantage that the supply bores 28' can be arranged as closely to the bottom of the pressure fluid reservoir 2 as desired. As the supply bores 28' serve for pressure fluid supply on every braking operation, safety is enhanced because the supply bores 28' will always lie below the pressure fluid level 31', even in the event of the vehicle being in an extremely inclined position. Therefore, the pressure fluid level 31' can be chosen to be lower than in FIG. 2.

Herein the non-return valve 33' is of a design different from FIG. 2. It is opened in its inactive position, since its closure member is placed on the bottom due to its gravity. Only when the piston moves downwardly will the closure member be lifted by the pressure fluid flow to close the pressure fluid valve 33'.

The fact that in the presence of a lower pressure fluid level 31' the non-return valve 33' will possibly lie above said level does not impair the normal braking operation because it is of significance only for traction slip control.

What is claimed is:

1. A traction control brake system, comprising:
   a master cylinder, including a reservoir for containing a pressure fluid,
   a fluid connecting line connecting said master cylinder to at least one wheel brake on a driven wheel;
   a low pressure accumulator connected to said fluid connecting line,
   a return-delivery pump disposed between said low pressure accumulator and said wheel brake,
   wherein said reservoir includes a supply pressure generating means for supplying fluid delivery for traction slip control.

2. A brake system as claimed in claim 1, wherein generation of the supply pressure is effected through the master cylinder.

3. A brake system as claimed in claim 2 wherein a joint connecting socket for pressure fluid delivery from the pressure fluid reservoir to the master cylinder is used for both a pedal-operating braking operation and a traction slip control operation.

4. A brake system as claimed in claim 1 wherein the supply pressure is used for preliminary fill-up of the wheel brake during a traction slip control operation.

5. A brake system as claimed in claim 1 wherein the supply pressure is delivered to the suction side of the pump.

6. A brake system as claimed in claim 1 wherein the supply pressure generating means is operated by a vacuum source.

7. A brake system as claimed in claim 1 wherein the supply pressure generating means is operated by a lifting magnet.

* * * * *